Figure 1:
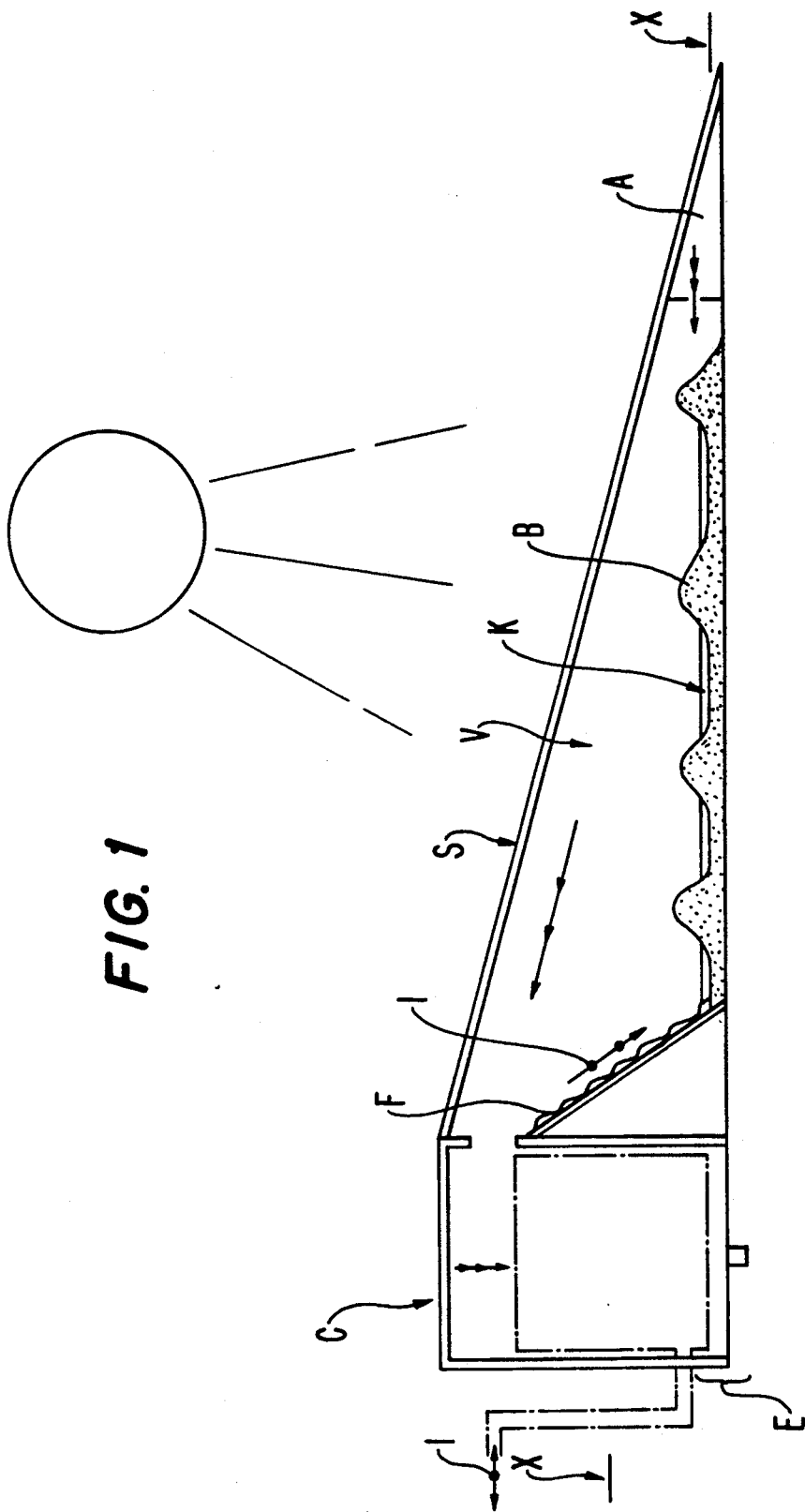

United States Patent [19]

Guy

[11] Patent Number: 5,316,626
[45] Date of Patent: May 31, 1994

[54] PROCESS AND APPARATUS FOR THE PRODUCTION OF FRESH WATER USING SOLAR ENERGY

[76] Inventor: Blondel Guy, 58 rue Catoire, 59185 Provin, France

[21] Appl. No.: 838,277

[22] PCT Filed: Sep. 11, 1990

[86] PCT No.: PCT/FR90/00646

§ 371 Date: Mar. 13, 1992

§ 102(e) Date: Mar. 13, 1992

[87] PCT Pub. No.: WO91/04228

PCT Pub. Date: Apr. 4, 1991

[30] Foreign Application Priority Data

Sep. 15, 1989 [FR] France .................. 89 12137

[51] Int. Cl.$^5$ .................... B01D 3/02; C02F 1/14
[52] U.S. Cl. .................... 203/10; 203/22; 203/49; 203/DIG. 1; 159/903; 159/DIG. 28; 202/177; 202/180; 202/234; 202/266
[58] Field of Search .................... 203/DIG. 1, 49, 22, 203/10, 25; 202/234, 177, 180, 266; 159/DIG. 29, DIG. 28, 903

[56] References Cited

U.S. PATENT DOCUMENTS

| | | | |
|---|---|---|---|
| 102,633 | 5/1870 | Wheeler et al. | 203/DIG. 1 |
| 983,424 | 2/1911 | Brosius | 159/903 |
| 2,402,737 | 6/1946 | Delano | 203/DIG. 1 |
| 2,405,877 | 8/1946 | Delano | 203/DIG. 1 |
| 3,257,291 | 6/1966 | Gerber | 159/903 |
| 3,282,327 | 11/1966 | Hardy et al. | 159/903 |
| 3,337,418 | 8/1967 | Halacy | 203/DIG. 1 |
| 3,351,538 | 11/1967 | Andrassy | 203/DIG. 1 |
| 3,775,257 | 11/1973 | Lovrich | 203/DIG. 1 |
| 3,992,246 | 11/1976 | Welch | |
| 4,055,473 | 10/1977 | Hay | 203/DIG. 1 |
| 4,172,767 | 10/1979 | Sear | 203/49 |
| 4,326,923 | 4/1982 | Mortenson | 159/903 |
| 4,487,659 | 12/1984 | Stark | 203/DIG. 1 |
| 4,521,276 | 6/1985 | Tsumura et al. | 159/DIG. 28 |
| 4,882,071 | 11/1989 | Bench et al. | 159/DIG. 28 |

FOREIGN PATENT DOCUMENTS

| | | |
|---|---|---|
| 673587 | 3/1939 | Fed. Rep. of Germany . |
| 1517530 | 1/1970 | Fed. Rep. of Germany . |
| 2507593 | 9/1976 | Fed. Rep. of Germany . |
| 3625452 | 2/1988 | Fed. Rep. of Germany . |
| 1354196 | 1/1964 | France . |
| 2372771 | 6/1978 | France . |
| 03323 | 12/1970 | World Int. Prop. O. . |

Primary Examiner—Wilbur Bascomb, Jr.
Attorney, Agent, or Firm—Kerkam, Stowell, Kondracki & Clarke

[57] ABSTRACT

In a method for producing fresh water using solar energy, the method involving the use of an installation comprising a structure oriented toward the sun and permeable to solar radiation, forming a greenhouse including a preheating and reheating chamber and an evaporation chamber into which water containing impurities is introduced to be evaporated by the indirect influence of the solar radiation in the air trapped under the structure, the air being conveyed to a temperature exchanger such that the vapors carried thereby will be condensed and collected, the improvement comprising evaporation of the water containing impurities on mounds of capillary material scattered and distributed over the entire span of the evaporation chamber.

9 Claims, 3 Drawing Sheets

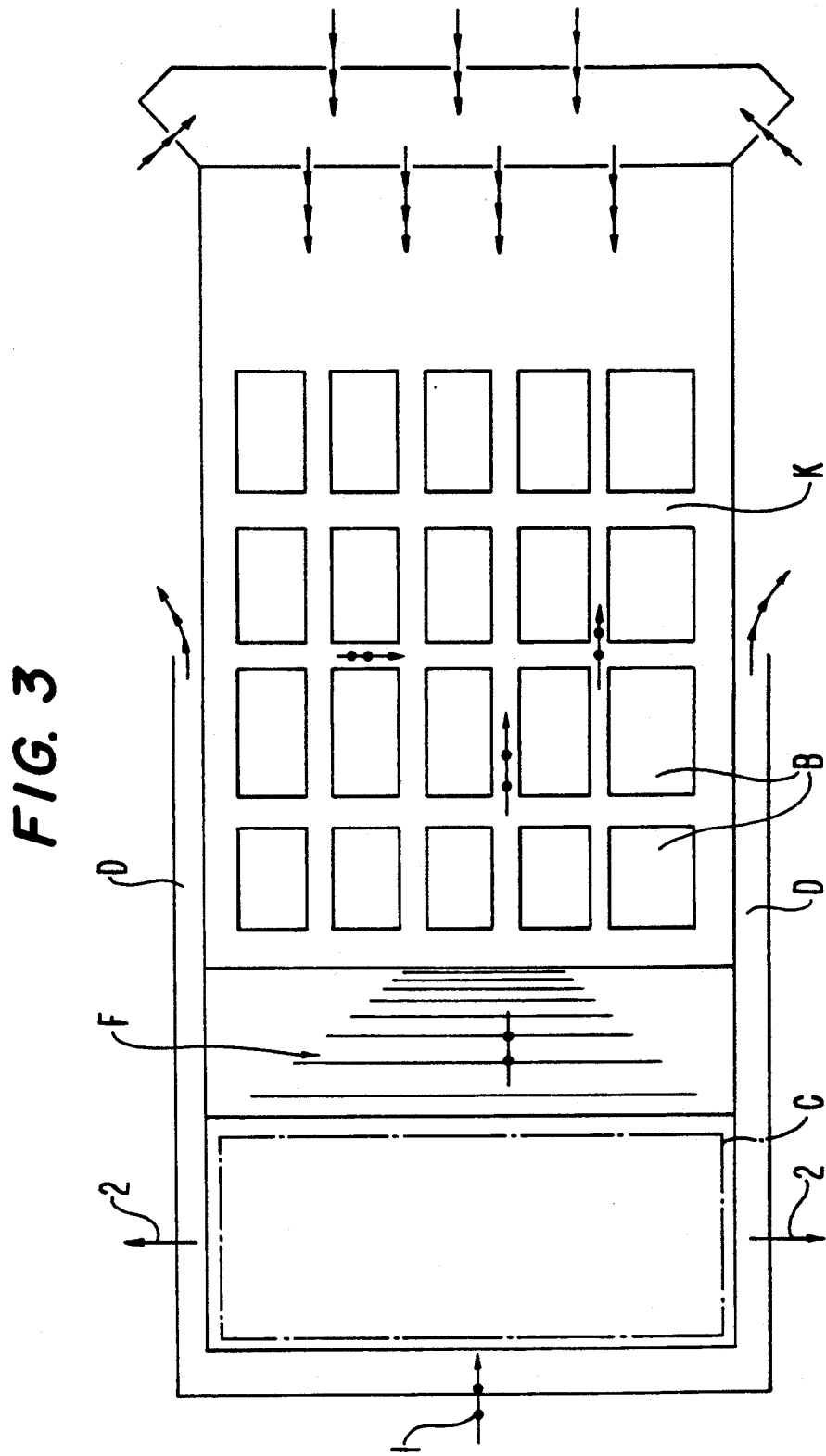

PROCESS AND APPARATUS FOR THE PRODUCTION OF FRESH WATER USING SOLAR ENERGY

The present invention relates to a process for producing fresh water from water containing impurities.

It also relates to the installation for implementing the process according to the invention.

The term "water containing impurities" is understood to include seawater, brackish water, swamp water, or industrial waste water.

An installation is known (African Intellectual Property Organization Document 3323) that includes a span covered with a structure permeable to solar radiation, forming a greenhouse, into which the water to be treated is brought by flowing by gravity.

At least indirectly under the influence of the solar radiation, this water is evaporated in the air trapped under the structure.

By a convection current, the air, more or less laden with water vapor, is carried to a temperature exchanger in which the vapor is condensed and collected, while the dried air is then recycled to the greenhouse or vented to the atmosphere.

In the known installations, the major disadvantage is the low yield.

To increase this yield, the air must be saturated faster; frequently, means for atomizing the water containing impurities in the air trapped under the structure are used for this purpose.

These atomizing means are expensive to maintain, because they carry the water containing impurities and accordingly are especially subject to clogging and to attack, for example by the salt contained in the water.

One of the objects the invention seeks to attain is to overcome the above problems.

To this end, the invention relates to a process of the type described above, characterized in particular in that the evaporation of the water containing impurities is done on mounds of capillary material scattered and distributed over the entire span of the evaporation chamber, between which mounds the fluid containing impurities is made to circulate.

It also relates to the installation implementing this process.

Figure 2:
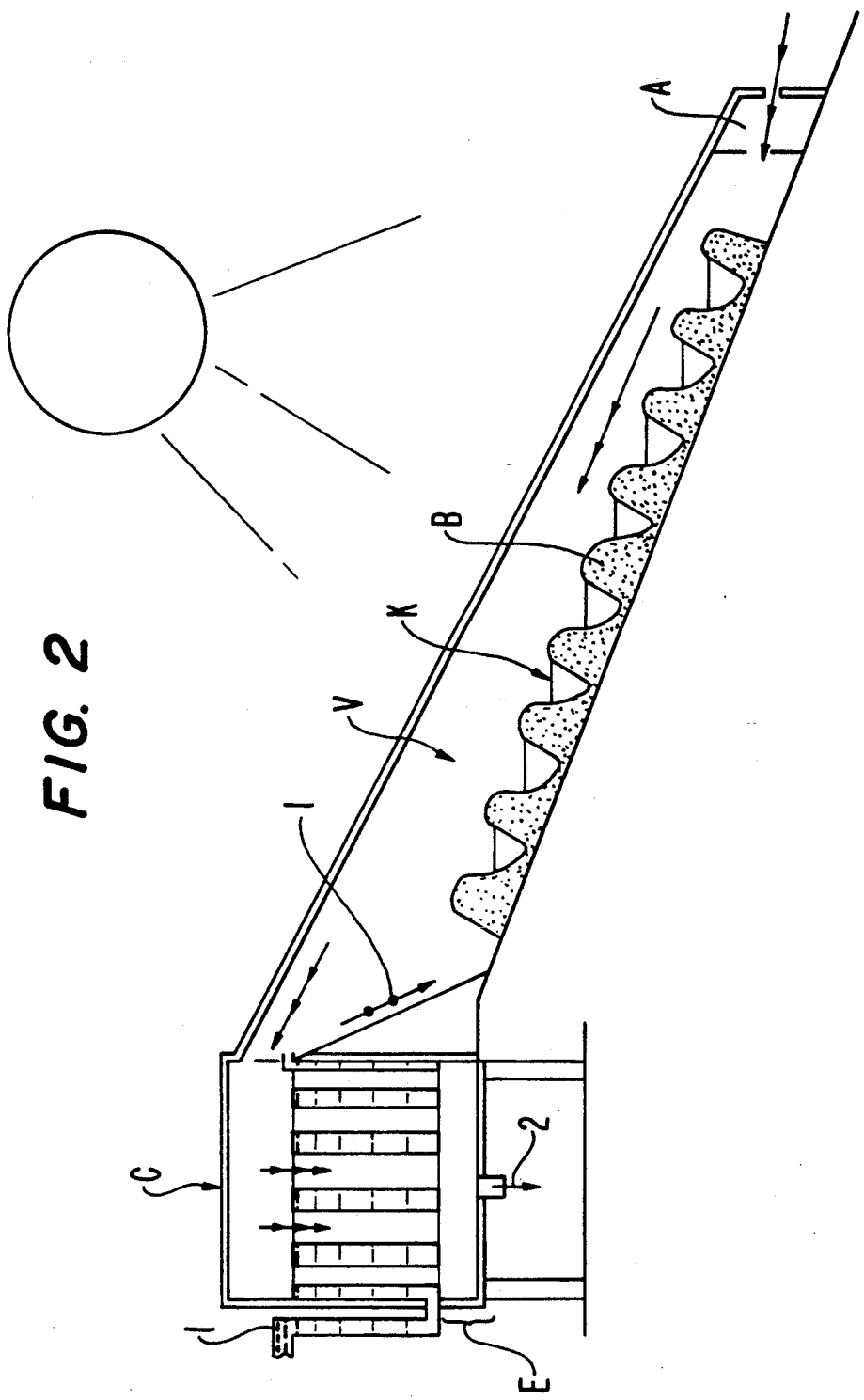

The invention will be better understood from the ensuing description made by way of non-limiting example, in conjunction with the accompanying drawings, which schematically show the following:

FIG. 1: an installation seen in profile;
FIG. 2: a variant embodiment of the installation;
FIG. 3: a section taken along the line X—X of FIG. 1.

In these drawing figures, reference numeral 1 corresponds to the water to be treated, and reference numeral 2 to the water produced; the arrow with three arrow heads represents the air circulation, and the arrow with one arrow head and two circles represents the water circulation.

The installation is constituted by a structure S oriented toward the sun, which is quasi-sealed off from the air to prevent any escape of air to the atmosphere and is permeable to solar radiation in order to create a maximum greenhouse effect on its internal face.

This structure is inclined and rises from a preheating and reheating zone A, where the entrance of the air occurs, to an exchanger C where the water is introduced.

The nature of its material is resistant to ultraviolet and infrared radiation and withstands a temperature of at least 110° C.

This structure is weather-resistant and is flexible or rigid, with single, double or triple walls, depending on its geographic location and on the level of investment involved.

The structure is inclined from the air entrance toward the water entrance in order to allow the air to rise toward the exchanger.

The inclination of the structure S enables the recovery of any rainwater that may occur and cleaning of its upper face (from sand deposits, for instance).

The structure used may be convex, so as to enable concentration of the solar radiation, on the one hand, and on the other to enable suitable orientation, regardless of the site orientation or the solar azimuth. Under this structure S, where a maximum greenhouse effect prevails, are, first, a preheating and reheating chamber A for the air and then an evaporation chamber V, where characteristically the evaporation is done on mounds B of capillary material, which are scattered and distributed over the entire span of the evaporation chamber, and between which the fluid containing impurities is made to circulate; as an example, these mounds B are formed by the residues from evaporation of the water to be treated, which accumulate progressively with the daily repetition of the process.

These residues should be eliminated at least partially and periodically by any means, either mechanically or by a water jet. They are to be upgraded (sea salt), or injected into the sea or ponds.

The water to be treated, before circulating through the evaporation chamber, passes through the exchanger C.

Irrigation is done via channels K circulating between the mounds B in such a way as to cause the water to rise by capillary action in the mounds.

Adjoining the structure S is the exchanger C, where the water to be treated, raised in a system of pipes to the same level as the outlet of the exchanger, penetrates it there at the bottom and chills the bank of tubes of the exchanger.

In its upper portion, the exchanger receives the hot air, saturated with water vapor.

In its bottom portion E, the condensed water is recovered; the dried air passes through one or more cooling passageways D, where it gives up the remainder of the air vapor to cooled plates (the coolants may be supplied by solar energy by compression or absorption) and then returns either to the atmosphere or to the preheating and reheating chamber A.

This exchanger is thermally insulated from the atmospheric heat; the material must be resistant to attack by the water to be treated, to fresh water, and to the fixation of algae and various deposits.

Preferably, the exchanger is of the finned-tube type, which affords a large surface area of contact with the air that is more or less saturated with water vapor.

Between the exchanger C and the evaporation surface V, there is preferably a preheating and reheating plane F for the water to be treated.

This surface is formed in cascades, with the lower face thermally insulated; the nature of its material must be resistant to attack by the water to be treated, to the fixation of algae, and to ultraviolet radiation; must withstand a temperature of 110° C. at a minimum; and must be dark-colored, in order to absorb the solar radiation and give back the heat to be processed.

Description of the Process

A) Air Circulation

The air is reheated by the solar radiation in the chamber A; as it is heated, it rises under the structure S and in the evaporation chamber V becomes saturated with water via the water vapors that evaporate from the mounds B, which are also heated by solar radiation; the solar energy captured in the mounds causes the evaporation of the water in the air.

The saturated air is brought to the exchanger C, where the deposit of the water vapor it carries is brought about onto the cold walls of this exchanger, which are chilled by the cold water to be treated.

Because the chilling makes it denser, it descends into the lower part E of the exchanger, from which it passes then into the one or more passageways D, where it gives up the remaining water vapor to the cooled plates.

In a variant of the method, the air thus dried and chilled is returned to the preheating and reheating chamber A to be reheated once again.

The process begins over again, speeding up with the increase in power of the solar radiation.

When the dried air is returned to the atmosphere, atmospheric air is introduced into the preheating and reheating chamber A.

This introduction is done in such a way as to avoid perturbing the circulation of the air flowing to the exchanger.

B) Water Circulation

The seawater (brackish water, swamp water or waste water from industry) should preferably be drawn from a great depth so as to have an ideal temperature of 15° C.

If the water drawn is not cold enough for a satisfactory yield of the exchanger, then chilling may be provided.

After filtration, it is raised by a pump (the sole need for energy, although electrical pumps powered by photovoltaic cells may be used) to the same level as the outlet of the exchanger C and then is carried to the lower part of this exchanger.

By absorption of the calories from the hot, saturated air, the cold water to be treated, that has been brought to the exchanger C, is reheated; this water is made to rise in the exchanger C by the difference in density, and it is made to flow toward the channels K.

In the exchanger C, the water chills the saturated air and absorbs its calories; as it becomes heated, it rises and arrives at the top of the exchanger at a temperature of from 40° to 50° C.

It then cools, preferably on the inclined plane F; the cascading shape of this plane and the nature of its material, which absorbs the solar radiation, permit reheating of the water, which flows by gravity into the channels K, where it penetrates the mounds B and rises in them by capillary action.

These mounds, formed by the solid residues from the evaporation (sea salts, various sediments), absorb the solar energy and restore it to the water, which as a result vaporizes and then saturates the hot, dry air coming from the chamber A.

The matter dissolved in the water to be treated crystallizes on the outer face of the mounds B, increasing the height and surface area of exchange with the hot air; suspended matter not caught by the primary filtration is deposited in the channels K.

Unclogging of the channels K and regeneration of the mounds B is done periodically by any means, such as mechanical means or a water jet (fed by water to be treated).

The residues may be recovered (marine salts, clay for bricks, etc) or discharged into the sea (at a distance from where it was drawn), or discharged into settling ponds.

The fresh water condensed in the exchanger C and in the chambers D is recovered at E so as then to be distributed and assigned to various uses.

This process makes it possible to irrigate desert or semidesert regions, allowing populations to live comfortably and settle there.

Because of the simplicity of the process and installation, the cost prices of the fresh water produced are virtually negligible.

The very slight thermal inertia of the process allows a very fast startup in the mornings.

The process is adapted to any size of installation (from 1 liter per minute to 10 m$^3$ per second of fresh water produced) and is essentially intended for countries or islands that enjoy plenty of sunshine but lack freshwater resources.

The installations can be accommodated on quite various sites: salt works, ponds, mine faces or cliffs, plains, etc.

To prevent the volume of air to be heated from becoming overly large, particularly because of the elevation of the structure promoting the convection of the hot air, it is more important to provide a succession of stairstep chambers, so that the distance from the surface over which the water to be treated flows is limited to a low height.

I claim:

1. In a process for the production of fresh water from water containing impurities using solar energy, said process comprising providing an installation constituted by a structure oriented toward the sun and permeable to solar radiation, forming a greenhouse including a preheating and reheating chamber and an evaporation chamber, and comprising means for introducing water containing impurities into said greenhouse and means for withdrawing fresh water therefrom and introducing said water containing impurities into said greenhouse to be evaporated by the at least indirect influence of solar radiation in air trapped under said structure, said air being relayed to a heat exchanger so that vapors it carries will be condensed and collected, said heat exchanged air being removed via passageways and said condensed fresh water being withdrawn therefrom, the improvement wherein the evaporation of said water containing impurities is carried out on mounds of capillary material scattered and distributed over the entire span of the evaporation chamber.

2. The process of claim 1 characterized in that said mounds are irrigated by bringing water to be treated via a network of channels circulating between said mounds in such a way as to cause said water to rise in said mounds by capillary action, and evaporation of said water and saturation of air coming from said preheating and reheating chamber is effected with the aid of solar energy trapped by said mounds.

3. The process of claim 1 characterized in that said preheating and reheating chamber and said evaporation chamber, where said channels and mounds are located, are covered by a structure that allows said solar energy to pass therethrough with the greatest possible yield to obtain a maximum greenhouse effect, which structure is quasi-sealed to prevent escape to the atmosphere of the air saturated with water vapor, and is weather-proof; and said structure is inclined in order to have an ascending slope from said reheating chamber to said heat exchanger in order to allow reheated air to rise and to allow the flow and recovery at a low point of any possible rainfall.

4. The process of claim 1 characterized in that hot saturated air produced in said greenhouse is brought into said heat exchanger where, in contact with walls chilled by cold water containing impurities prior to introducing said water containing impurities into said greenhouse, a deposit onto said walls of a majority of the water vapor carried by the air is effected.

5. The process of claim 1 characterized in that the coldest possible said water containing impurities is provided so as to obtain the optimum yield of said heat exchanger.

6. The process of claim 1 characterized in that air leaving said heat exchanger is carried between cooling plates via which said air is dried and chilled.

7. The process of claim 1 characterized in that a bottom plane of the evaporation chamber contains reliefs and irrigation channels and is insulated with respect to the surface on which the installation rests and is sealed; and said heat exchanger and passageway or passageways are insulated from solar radiation.

8. The process of claim 7 characterized in that, by absorption of the calories of the hot saturated air, cold air that is brought into said heat exchanger is reheated and made to rise in said heat exchanger by the difference in density; and a cascading flow of said water containing impurities to the reliefs and channels is brought about by causing it to flow along an inclined plane which is insulated from said heat exchanger and on which inclined plane it is reheated by solar radiation.

9. An installation for the production of fresh water from water containing impurities which is constituted by a structure oriented toward the sun and permeable to solar radiation, forming a greenhouse including a preheating and reheating chamber and an evaporation chamber into which water containing impurities is introduced to be evaporated by the at least indirect influence of solar radiation in air trapped under said structure which is brought to a heat exchanger in order to be condensed and collected, characterized in that it includes mounds of capillary material that are scattered and distributed over the entire span of said evaporation chamber, between which mounds channels circulate.

* * * * *

UNITED STATES PATENT AND TRADEMARK OFFICE
CERTIFICATE OF CORRECTION

PATENT NO. : 5,316,626
DATED : May 31, 1994
INVENTOR(S) : Guy BLONDEL

It is certified that error appears in the above-indentified patent and that said Letters Patent is hereby corrected as shown below:

On the title page, under the heading "United States Patent [19]" the patentee's surname should be -- BLONDEL --.

On the title page, after "[76] Inventor:" change "Blondel Guy" to -- Guy Blondel --.

Signed and Sealed this

Twenty-third Day of August, 1994

Attest:

BRUCE LEHMAN

*Attesting Officer*    *Commissioner of Patents and Trademarks*